United States Patent
Kirsch et al.

(10) Patent No.: US 11,135,750 B2
(45) Date of Patent: Oct. 5, 2021

(54) INJECTION MOLD

(71) Applicant: Bayerische Motoren Werke Aktiengesellschaft, Munich (DE)

(72) Inventors: Stephan Kirsch, Karlsfeld (DE); Thorsten Rienecker, Munich (DE); Philipp Schlag, Munich (DE); Peter Schmid, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/776,564

(22) Filed: Jan. 30, 2020

(65) Prior Publication Data
US 2020/0164556 A1    May 28, 2020

Related U.S. Application Data

(63) Continuation of application No. PCT/EP2018/070708, filed on Jul. 31, 2018.

(30) Foreign Application Priority Data

Aug. 23, 2017  (DE) ..................... 10 2017 214 734.2

(51) Int. Cl.
*B29C 33/30* (2006.01)
*B29C 45/26* (2006.01)
(Continued)

(52) U.S. Cl.
CPC ........ *B29C 45/0441* (2013.01); *B29C 31/006* (2013.01); *B29C 33/301* (2013.01);
(Continued)

(58) Field of Classification Search
CPC ..... B29C 33/301; B29C 33/306; B29C 45/14; B29C 45/14639; B29C 45/14819;
(Continued)

(56) References Cited

U.S. PATENT DOCUMENTS

| 2,424,235 A | * | 7/1947 | Hoffer | ..................... B29C 45/26 249/53 R |
| 3,596,869 A | | 8/1971 | Humphrey | |

(Continued)

FOREIGN PATENT DOCUMENTS

| CN | 201863355 U | 6/2011 |
| CN | 104441353 A | 3/2015 |

(Continued)

OTHER PUBLICATIONS

International Search Report (PCT/ISA/210) issued in PCT Application No. PCT/EP2018/070708 dated Aug. 27, 2018 with English translation (five pages).

(Continued)

*Primary Examiner* — James P Mackey
(74) *Attorney, Agent, or Firm* — Crowell & Moring LLP

(57) ABSTRACT

An injection mold, in particular for encapsulating rotors of electric machines, has a mold, wherein the mold has an arrangement of mold segments. The arrangement forms, along a longitudinal axis, a cavity for a component to be arranged. An exchange unit is provided, which is designed to remove at least one mold segment from and/or insert at least one mold segment into the arrangement, with the result that a size of the cavity can be changed.

10 Claims, 1 Drawing Sheet

(51) Int. Cl.
*B29C 45/04* (2006.01)
*B29C 31/00* (2006.01)
*B29C 45/17* (2006.01)
*B29C 45/14* (2006.01)

(52) U.S. Cl.
CPC ...... *B29C 45/1742* (2013.01); *B29C 45/1756* (2013.01); *B29C 33/306* (2013.01); *B29C 45/14639* (2013.01); *B29C 45/2673* (2013.01); *B29C 45/2675* (2013.01); *B29C 2045/2677* (2013.01)

(58) Field of Classification Search
CPC ............ B29C 45/1756; B29C 45/2673; B29C 45/2675; B29C 2045/2677
See application file for complete search history.

(56) References Cited

U.S. PATENT DOCUMENTS

| | | | | |
|---|---|---|---|---|
| 3,871,611 A | * | 3/1975 | Taketa | B29C 45/2673 249/102 |
| 4,202,522 A | * | 5/1980 | Hanas | B29C 45/2673 249/102 |
| 10,384,403 B2 | * | 8/2019 | Stadler | B29C 45/14639 |
| 2005/0084558 A1 | * | 4/2005 | Scotti | B29C 45/2673 425/195 |
| 2012/0177772 A1 | * | 7/2012 | Judd | B29C 45/2602 425/542 |
| 2014/0077410 A1 | | 3/2014 | Takatsugi et al. | |

FOREIGN PATENT DOCUMENTS

| | | | |
|---|---|---|---|
| CN | 204451047 U | | 7/2015 |
| CN | 105108975 A | | 12/2015 |
| CN | 105522679 A | | 4/2016 |
| DE | 196 27 930 A1 | | 1/1998 |
| DE | 10 2007 025 519 A1 | | 12/2008 |
| DE | 10 2013 016 535 A1 | | 3/2014 |
| GB | 2222384 | * | 3/1990 |
| GB | 2233596 | * | 1/1991 |
| WO | WO 98/02262 | | 1/1998 |

OTHER PUBLICATIONS

German-language Written Opinion (PCT/ISA/237) issued in PCT Application No. PCT/EP2018/070708 dated Aug. 27, 2018 (five pages).

German-language Search Report issued in counterpart German Application No. 10 2017 214 734.2 dated May 15, 2018 with partial English translation (11 pages).

English translation of Chinese-language Office Action issued in Chinese Application No. 201880037257.0 dated Feb. 1, 2021 (eight (8) pages).

* cited by examiner

INJECTION MOLD

CROSS REFERENCE TO RELATED APPLICATIONS

This application is a continuation of PCT International Application No. PCT/EP2018/070708, filed Jul. 31, 2018, which claims priority under 35 U.S.C. § 119 from German Patent Application No. 10 2017 214 734.2, filed Aug. 23, 2017, the entire disclosures of which are herein expressly incorporated by reference.

BACKGROUND AND SUMMARY OF THE INVENTION

The present invention relates to an injection mold, in particular for the encapsulation of rotors of electrical machines, and to a method for producing encapsulated structural parts.

From the prior art, it is known to encapsulate structural parts with plastic, such as thermoplastic or thermosetting plastic. Thus it is customary, for instance, to encapsulate the rotors of electrically excited synchronous machines by injection molding, whereby, for instance, the rotation speed stability of the rotors can be increased. This presents the challenge that, in particular in the field of development, it is often necessary to construct rotor lamination stacks in a variety of lamination stack lengths or diameters, which leads to the problem that a new molding tool has to be designed and made available for each geometrical variant. In serial production too, there is an increasing demand for greater flexibility in order to be able to realize a wide variety of variants as cost effectively as possible.

It is therefore an object of the present invention to define an injection mold and a method for producing encapsulated structural parts which are constructed in a cost-effective and extremely flexible manner.

According to the invention, an injection mold, in particular for the encapsulation of rotors of electrical machines, comprises a molding tool, wherein the molding tool has an arrangement of mold segments. The arrangement forms, along a longitudinal axis, a cavity for a structural part which is to be arranged, in particular a rotor of an electrical machine. An exchange unit, which is designed to remove at least one mold segment from and/or insert at least one mold segment into the arrangement is provided, whereby a size, in particular a diameter and/or a length, of the cavity can be altered. The structural parts are constituted, for instance, by rotors of electrically excited synchronous machines, in particular copper-clad rotors or armatures, which are composed of a plurality of laminations to form laminated cores. Advantageously, the molding tool or its cavity can now be adapted to widely different rotor sizes, by which is meant, in particular, different rotor diameters and/or rotor lengths, namely, in particular, by virtue of one or more mold segments being able to be changed via the exchange unit. For instance, a length of the cavity can be straightforwardly extended by the insertion of a mold segment, or shortened by the removal of a mold segment.

Expediently, at least one of the mold segments forming the molding tool is arranged or configured such that it is movable along the longitudinal axis, so that, after the removal of a mold segment, the molding tool can be closed again in order to form a closed cavity or form a space for the arrangement of one or more further mold segments. There is thereby provided an extremely flexible injection mold, which, in particular, also offers the advantage that, when switching to a new variant, no extensive warming of the molding tool is necessary, since, by the exchange unit, such a rapid exchange of the mold segments is enabled that heating can be dispensed with or it is sufficient to maintain the molding tool at a certain temperature, for instance by means of a heating cartridge.

According to one embodiment, the exchange unit has at least one rotary element, which is designed to move the at least one mold segment. In particular, the rotary element is constituted by a turntable, which is designed to move the at least one mold segment, in particular to remove it from the arrangement, or insert it into the same, transversely to the aforementioned longitudinal axis.

Preferably, a rotational axis of the rotary element is oriented offset from and parallel to the longitudinal axis, wherein the at least one rotary element is also advantageously movable along the longitudinal axis. This enables a flexible removal or flexible insertion of, in particular, also different large mold segments and, in particular, also in different heights.

At this point it should be mentioned that the structural parts are expediently vertically encapsulated. The longitudinal axis of the molding tool advantageously runs along an upright normal axis. Preferably, a thermosetting plastic and/or a thermoplastic is used as the material.

Preferably, the exchange unit and the rotary element provide a multiplicity of differently dimensioned mold segments. By this is meant, for instance, that on the rotary element is positioned or arranged a plurality of differently dimensioned mold segments. The rotary element can also be configured such that it is designed to hold or grip differently dimensioned mold elements. According to an alternative embodiment, the exchange unit can also be realized via a robot, for instance via a six-axis robot arm, which is designed in such a way and parametrized to such effect as to displace the mold segments, arrange them, remove them from the arrangement, or insert them, etc.

According to a preferred embodiment, the molding tool has at least three mold segments, which are arranged along the longitudinal axis in order to form the cavity or an arrangement space for a structural part. Two mold segments are here configured as end segments, and an intervening mold segment as a, for instance disk-shaped or annular, middle segment. A length of the cavity can advantageously be straightforwardly and rapidly changed via the removal of the middle segment. The two end segments are advantageously configured such that a minimal structural part length or a minimal rotor length is covered. Preferably, the end segments have for this purpose a roughly pot-like basic shape, so that, by bringing the end segments closer together, a "new" cavity can be shaped and closed. Alternatively, the end segments can also be configured such that they (merely) form an axial extremity of the cavity. Depending on the embodiment, also differently long middle segments or a plurality of middle segments can be positioned between the end segments in order to set a desired length of the cavity. According to one embodiment, the end segments too are arranged on rotary elements, wherein the rotary elements are advantageously designed to provide differently dimensioned end segments, whether in terms of the diameter and/or their length. Thus, not only structural parts/rotors of different length, but also structural parts/rotors having different diameters, can be encapsulated. According to a preferred embodiment, the cavity is shaped cylindrically or substantially cylindrically.

Expediently, a plurality of rotary elements is arranged or provided along the longitudinal axis. As already mentioned, a length of the cavity can hence be straightforwardly adjusted, for instance via the number of otherwise, for instance, identically configured middle segments.

According to one embodiment, the at least one rotary element is configured in the shape of a circular disk.

According to one embodiment, the rotary element has recesses. These recesses preferably form circular-segment-shaped rotary element portions and have, in particular, the advantage that two rotary elements, for instance, which are correspondingly mutually twisted, can be moved in a collision-free manner along the longitudinal axis.

According to one embodiment, a mold segment is configured as a rotary element. The mold segment per se can thus, for instance, be moved by rotation.

Expediently, the mold segment configured as a rotary element has a plurality of sub-cavities. Ultimately, the cavity of the mold segment is formed via a plurality of sub-cavities, which, in turn, are formed by the various mold segments. According to one embodiment, the aforementioned mold segment is constituted, for instance, by a circular disk, which has a plurality of differently dimensioned openings, which are arranged at a radial distance from a rotational axis of the disk-shaped mold segment, so that, by a twisting of the circular disk, (sub-)cavities of different diameter can be provided. According to one embodiment, the circular disk has in some sections a different thickness, whereby a length of the cavity can also be changed.

According to one embodiment, the circular-disk-shaped mold segment has recesses, the function of which has already been described further above. In particular, a sub-cavity can be removed from (or introduced into) the arrangement by rotating the disk-shaped mold segment.

The injection mold additionally further comprises structural parts and components such as guide elements, along which the mold segments are guided, a cooling and/or heating system, ejector elements, at least one sprue element or a sprue bush, etc.

The invention also relates to a method for producing encapsulated structural parts, in particular rotors of electrical machines, comprising the steps of:
providing an injection mold having a molding tool which has an arrangement of mold segments, wherein the arrangement forms a cavity;
positioning a first structural part in the cavity and encapsulating with a material;
removing and/or inserting at least one mold segment in order to alter a size of the cavity, and positioning a second structural part in the cavity for encapsulation.

Expediently, the method further comprises the step of:
changing a number of mold segments in order to change the length of the cavity.

Preferably, the method further comprises the step of:
providing mold segments having other or different diameters and/or lengths, whereby cavities or arrangement spaces for structural parts of different length can be formed.

The advantages and features mentioned in conjunction with the injection mold apply analogously and correspondingly to the method, and also vice versa and between one another.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
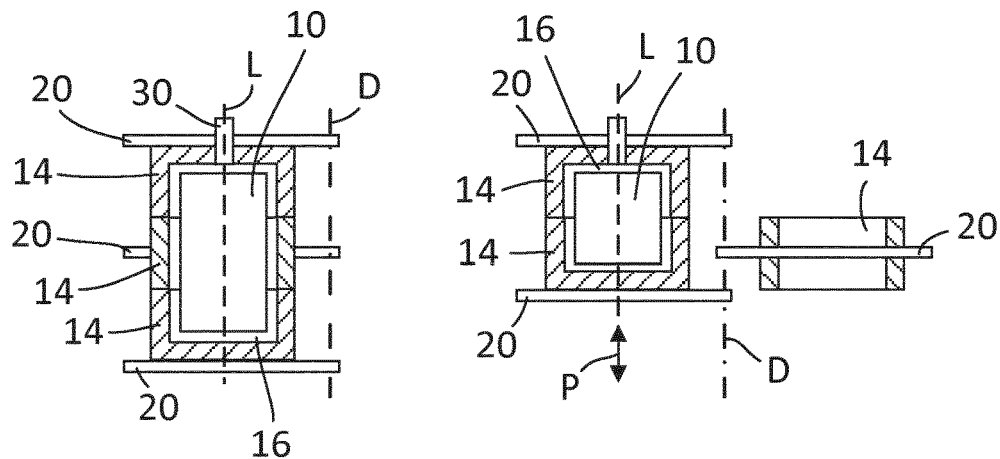
FIG. 1 is a sectional view of an injection mold having an exchange unit.

FIG. 1 shows in its left diagram half a molding tool, comprising three mold segments 14, wherein these are constituted, in particular, by a middle segment and two (pot-like) end segments. These form an arrangement space or a cavity 16 for a structural part 10. The representation is in the form of a sketch, so that it is not shown how the actual arrangement is realized. What is important is that the injection mold comprises an exchange unit, which, in the embodiment shown here, has three rotary elements 20, the rotational axis D of which is oriented substantially parallel to or offset from a longitudinal axis L of the molding tool. Also represented schematically is that the upper end segment or mold segment 14 comprises a sprue element 30, via which the injection of a material, for instance thermosetting plastic or thermoplastic, is realized. With reference to the right diagram half, it can be seen that the middle rotary element 20 has been pivoted, whereby, accordingly, the middle mold segment 14 has been removed from the molding tool. By a movement of the lower end segment or of the lower mold segment 14, cf. the double arrow P, the molding tool has been closed again, whereby a cavity 16, which is markedly shorter than that in the left diagram half, is shaped. Accordingly, a shorter structural part 10 can now be encapsulated. It is easily possible that, for instance, the middle rotary element provides a plurality of mold segments having different lengths, whereby the length of the cavity can be further adjusted. Likewise, it would be possible for a plurality of middle rotary elements to be provided, whereby a plurality of middle segments can be arranged (one above another). Equally, it is possible for the outer rotary elements, which provide the end-side mold segments, to provide a plurality of end-side mold segments having different diameters (or lengths), etc.

Figure 2:
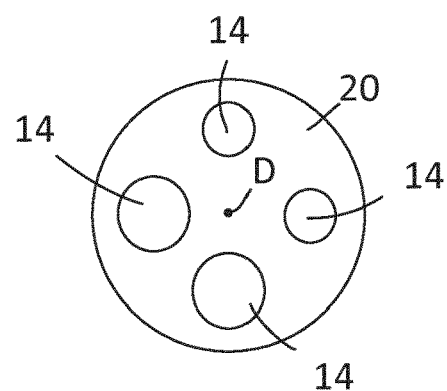
FIG. 2 is a top view of a rotary element.

FIG. 2 shows schematically in a top view a rotary element 20, which provides mold segments 14 having different diameters.

Figure 3:
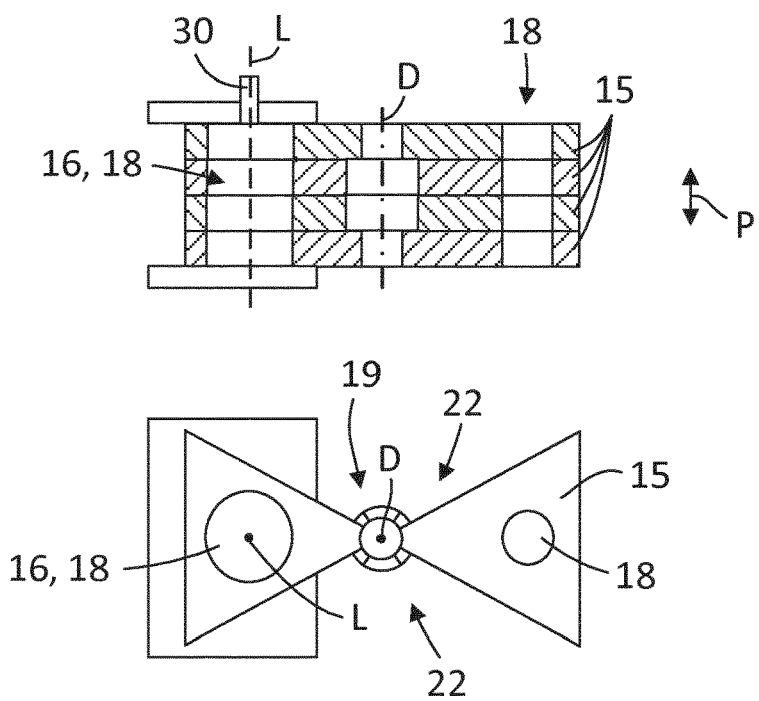
FIG. 3 is an injection mold, wherein mold segments are configured as rotary elements.

FIG. 3 shows schematically a plurality of mold segments 15 which are configured as rotary elements and have appropriate sub-cavities 18 of different diameter. In the configuration which is shown here, the molding tool, comprising the mold segments 15, is designed such that a cavity 16 is formed along a longitudinal axis L. In the lower diagram half, a top view of the molding tool is represented, wherein it can be seen that the rotary element or the mold segments 15 configured as a rotary element have recesses 22. For instance, it is possible to shape a shorter cavity by twisting the two middle mold segments 15 through an angle of 90° and pushing together the outer mold segments 15, cf. the double arrow P. A displacement along the longitudinal axis L can here be realized via suitable slots or guide elements in the bearing region 19 of the mold segments 15. Equally, it is possible to move all mold segments 15 such that a cavity 16 having a smaller diameter is formed, etc.

REFERENCE SYMBOL LIST 10 structural part, rotor
14 mold segment
15 mold segment (rotary element)
16 cavity
18 sub-cavity 19 bearing region
20 rotary element
22 recess
30 sprue element
P double arrow
L longitudinal axis
D rotational axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An injection mold, comprising:
a molding tool; and
an exchange unit,
wherein
the molding tool has an arrangement of mold segments,
the arrangement forms, along a longitudinal axis, a cavity for a structural part which is to be arranged, and
the exchange unit is configured to at least one of
remove at least one of the mold segments from the arrangement of mold segments which form the cavity, and
insert the at least one of the mold segments into the arrangement of mold segments which form the cavity,
a longitudinal height of the arrangement of mold segments is decreased after removal of the at least one mold segment, and
the longitudinal height of the arrangement of mold segments is increased after insertion of the at least one mold segment.

2. The injection mold according to claim 1, wherein the exchange unit has at least one rotary element, which is designed to move the at least one mold segment of the arrangement of mold segments laterally relative to the longitudinal axis.

3. The injection mold according to claim 2, wherein a rotational axis of the rotary element is oriented offset from and parallel to the longitudinal axis, and
the at least one rotary element is movable along the longitudinal axis.

4. The injection mold according to claim 1, wherein the exchange unit provides differently dimensioned mold segments.

5. The injection mold according to claim 2, wherein a plurality of the rotary elements is provided along the longitudinal axis.

6. The injection mold according to claim 2, wherein the at least one rotary element is configured in the shape of a circular disk.

7. The injection mold according to claim 2, wherein the at least one rotary element has recesses.

8. The injection mold according to claim 2, wherein at least one of the mold segments is configured as the rotary element.

9. The injection mold according to claim 8, wherein the mold segment configured as the rotary element has a plurality of sub-cavities.

10. The injection mold according to claim 1, wherein the cavity is configured to encapsulate a rotor of an electrical machine.

* * * * *